US009326161B2

(12) United States Patent
Wang et al.

(10) Patent No.: US 9,326,161 B2
(45) Date of Patent: Apr. 26, 2016

(54) APPLICATION-DRIVEN CONTROL OF WIRELESS NETWORKING SETTINGS

(75) Inventors: Zhou Wang, Aachen (DE); Chen Zhao, Oslo (NO); Alain Gefflaut, Kirkland, WA (US); William Dunlap, Aachen (DE); Wolfgang Manousek, Aachen (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 258 days.

(21) Appl. No.: 13/529,816

(22) Filed: Jun. 21, 2012

(65) Prior Publication Data

US 2013/0343190 A1    Dec. 26, 2013

(51) Int. Cl.
H04L 12/26        (2006.01)
H04W 24/02       (2009.01)
H04L 12/24        (2006.01)
H04L 12/813      (2013.01)
H04W 28/18       (2009.01)

(52) U.S. Cl.
CPC ........... *H04W 24/02* (2013.01); *H04L 41/0896* (2013.01); *H04L 47/20* (2013.01); *H04W 28/18* (2013.01)

(58) Field of Classification Search
CPC . H04L 41/0893; H04L 41/0896; H04L 47/20; H04L 47/22; H04W 28/18; H04W 28/20; H04W 28/22; H04W 28/24; H04W 28/26; H04W 24/02
USPC ......... 370/252, 253, 329, 330, 335, 336, 463, 370/465, 232, 235; 709/224
See application file for complete search history.

(56) References Cited

U.S. PATENT DOCUMENTS

| | | |
|---|---|---|
| 6,535,742 B1 | 3/2003 | Jiang et al. |
| 6,977,912 B1 | 12/2005 | Porter et al. |
| 6,990,087 B2 | 1/2006 | Rao et al. |
| 7,035,642 B2 | 4/2006 | Rappaport et al. |

(Continued)

OTHER PUBLICATIONS

Zulhasnine, et al., "Efficient Resource Allocation for Device-to-Device Communication Underlaying LTE Network", Retrieved at <<http://ieeexplore.ieee.org/stamp/stamp.jsp?tp=&arnumber=5645039>>, IEEE 6th International Conference on Wireless and Mobile Computing, Networking and Communications (WiMob), Oct. 11-13, 2010, pp. 368-375.

(Continued)

*Primary Examiner* — Kwang B Yao
*Assistant Examiner* — Harun Chowdhury
(74) *Attorney, Agent, or Firm* — Sandy Swain; Micky Minhas

(57) ABSTRACT

Embodiments related to automatically adjusting wireless network settings based upon utilization of a wireless network link by applications are disclosed. For example, one disclosed embodiment provides a method of adjusting a wireless networking setting for a wireless network link. The method includes monitoring data flow through a network interface controller to collect, for each of one or more applications running on the computing device and communicating over the wireless network link, flow performance data comprising information regarding an amount of data flow arising from the application. The method also includes monitoring link data comprising information regarding data being sent and received over the wireless network link, and based upon the flow performance data and the link data, controlling a network interface controller to adjust the wireless networking parameter to change a configuration of the network link.

18 Claims, 5 Drawing Sheets

(56) References Cited

U.S. PATENT DOCUMENTS

| | | | |
|---|---|---|---|
| 7,961,726 B2 | 6/2011 | Wang et al. | |
| 8,626,896 B2 * | 1/2014 | Winter | 709/224 |
| 2006/0072502 A1 * | 4/2006 | Crandall et al. | 370/329 |
| 2007/0230500 A1 * | 10/2007 | Spenik et al. | 370/465 |
| 2008/0008188 A1 | 1/2008 | Buga et al. | |
| 2009/0086650 A1 * | 4/2009 | Moore et al. | 370/253 |
| 2009/0196173 A1 | 8/2009 | Wang et al. | |
| 2012/0281715 A1 * | 11/2012 | Shojania et al. | 370/468 |

OTHER PUBLICATIONS

Rerkrai, et al., "Design and Implementation of Utility-Based Radio Resource Optimization Using CAPRI", Retrieved at <<http://ieeexplore.ieee.org/stamp/stamp.jsp?tp=&arnumber=5982891>>, 7th International Wireless Communications and Mobile Computing Conference (IWCMC), Jul. 4-8, 2011, pp. 2262-2267.

Khan, et al., "Application-driven cross-layer optimization for video streaming over wireless networks", Retrieved at <<http://ieeexplore.ieee.org/stamp/stamp.jsp?tp=&arnumber=1580942>>, IEEE, Communications Magazine, vol. 44, Issue 1, Jan. 2006, pp. 122-130.

* cited by examiner

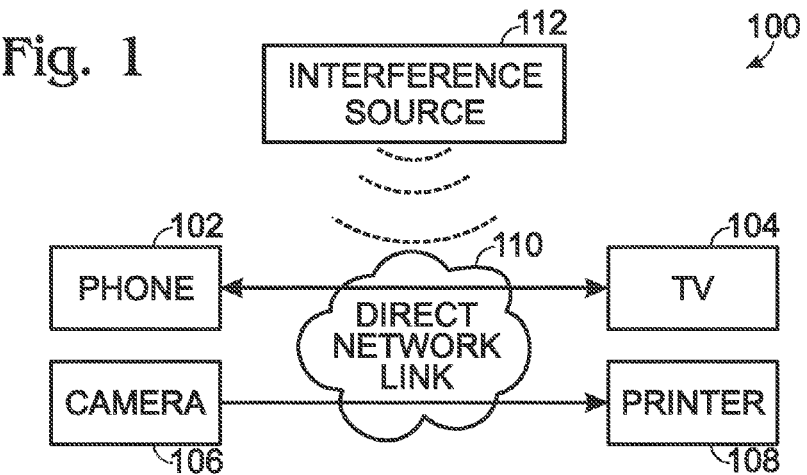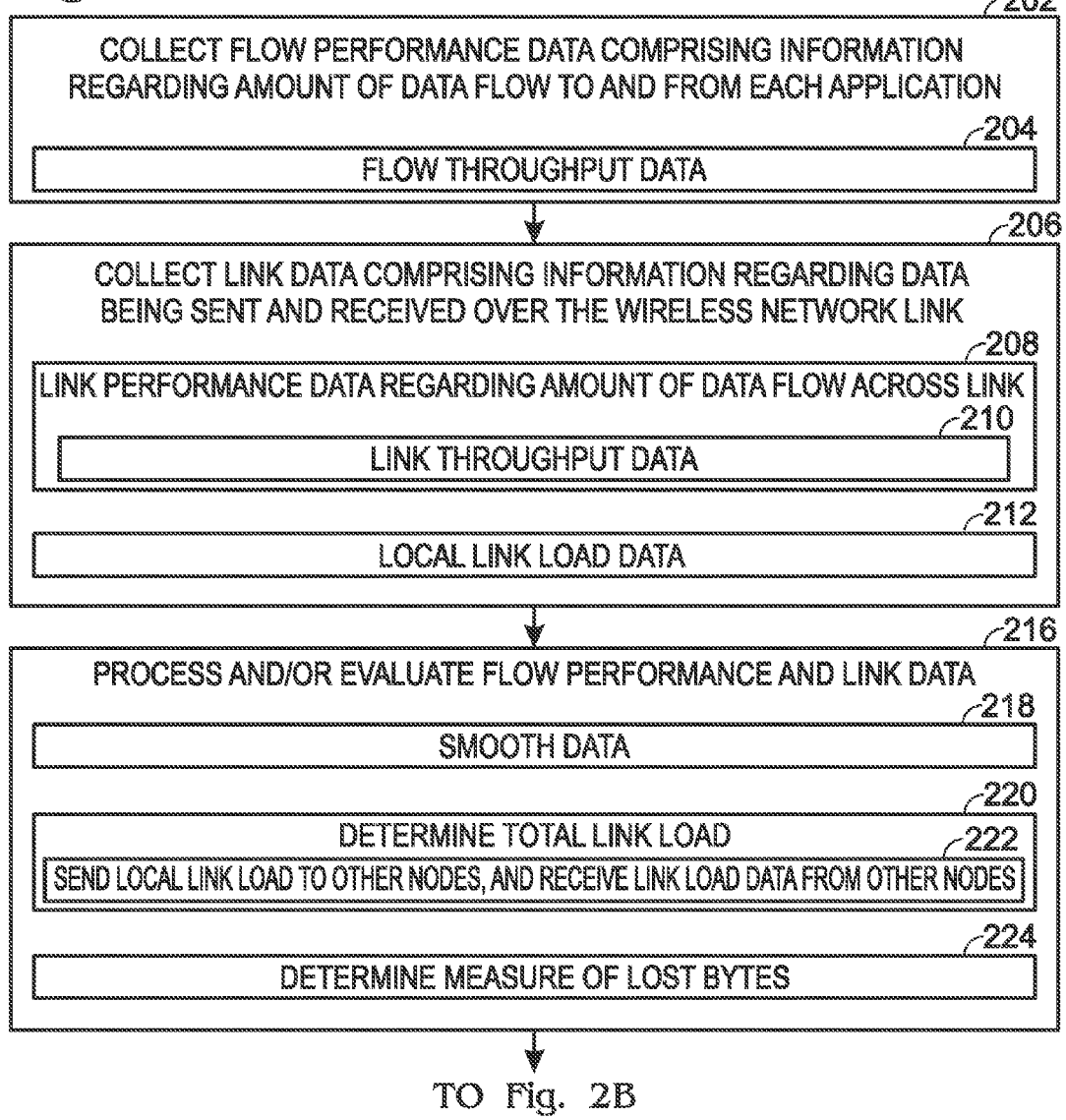

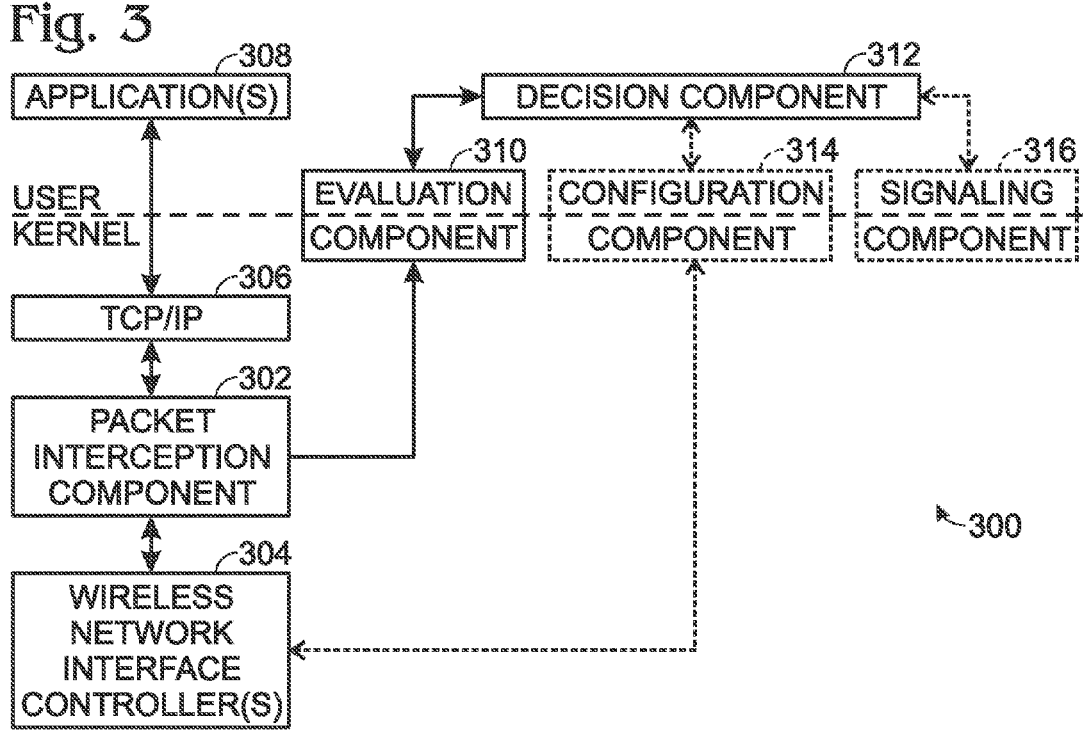
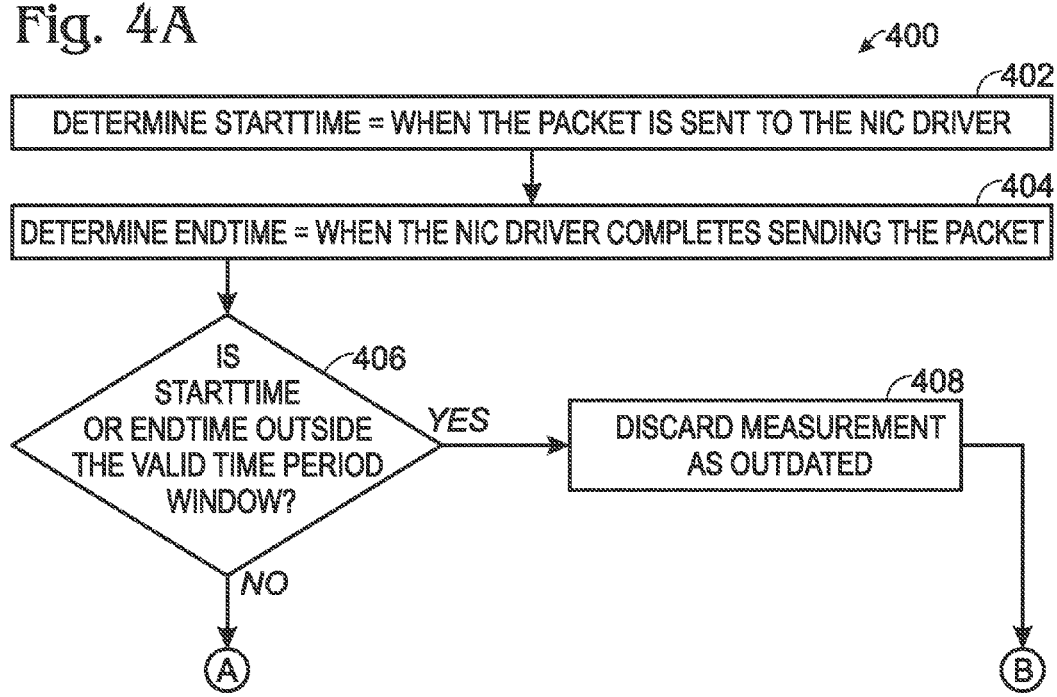

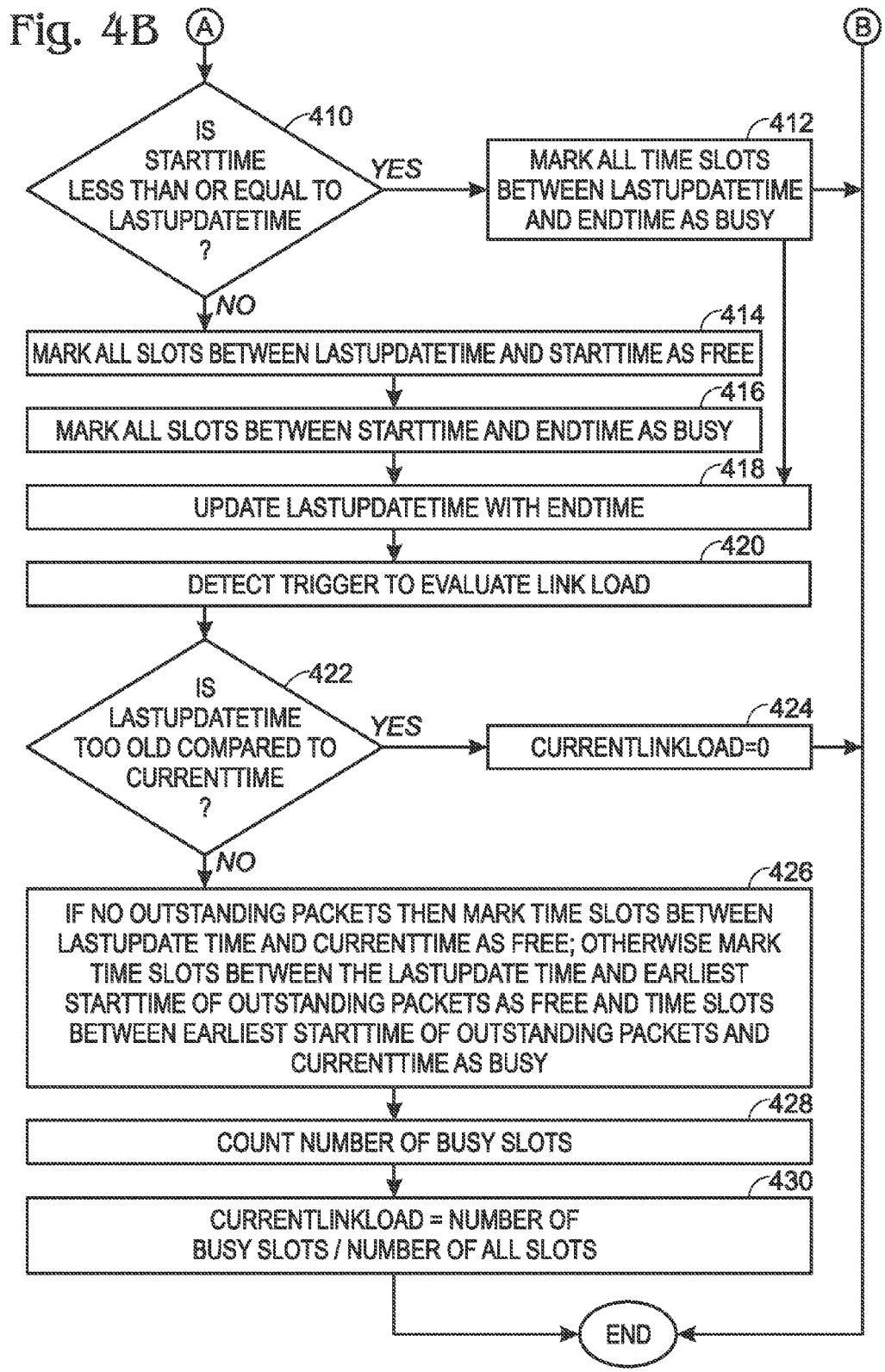

APPLICATION-DRIVEN CONTROL OF WIRELESS NETWORKING SETTINGS

BACKGROUND

With the rapid advancement in wireless technology, more and more devices, including computing devices and consumer electronics like televisions and digital media appliances, are embedding one or more wireless network interfaces. The high penetration rate of wireless communication not only may allow devices to easily connect to available networks, but also may help to enable an increasing usage of direct connections between devices. Currently, in most networks using IEEE 802.11 technology, devices are connected with each other through an access point, and all traffic between devices passes through the access point. In contrast, by using direct connections, a portable device may be able to exchange data with another portable device without any cable, and without passing through such an access point or relying on any existing network infrastructure. As an example, a mobile phone may directly stream videos to a TV, or sync/exchange its media content with another mobile phone.

SUMMARY

Embodiments related to automatically adjusting wireless network settings based upon utilization of a wireless network link by applications are disclosed. For example, one disclosed embodiment provides a method of adjusting a wireless networking setting for a wireless network link. The method includes monitoring data flow through a network interface controller to collect, for each of one or more applications running on the computing device and communicating over the wireless network link, flow performance data comprising information regarding an amount of data flow arising from the application. The method also comprises monitoring link data comprising information regarding data being sent and received over the wireless network link. Further, the method comprises controlling a network interface controller to adjust the wireless networking parameter to change a configuration of the network link based upon the flow performance data and the link data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows an embodiment of a wireless network use environment.

FIGS. 2A-2B show a flow diagram depicting an embodiment of a method of controlling wireless network link settings based upon usage of the wireless network link by applications.

FIG. 3 shows a block diagram of an embodiment of an architecture for a system for controlling wireless network link settings.

FIGS. 4A-4B show a flow diagram depicting an embodiment of a method of determining a local link load for a wireless link.

DETAILED DESCRIPTION

Figure 2B:
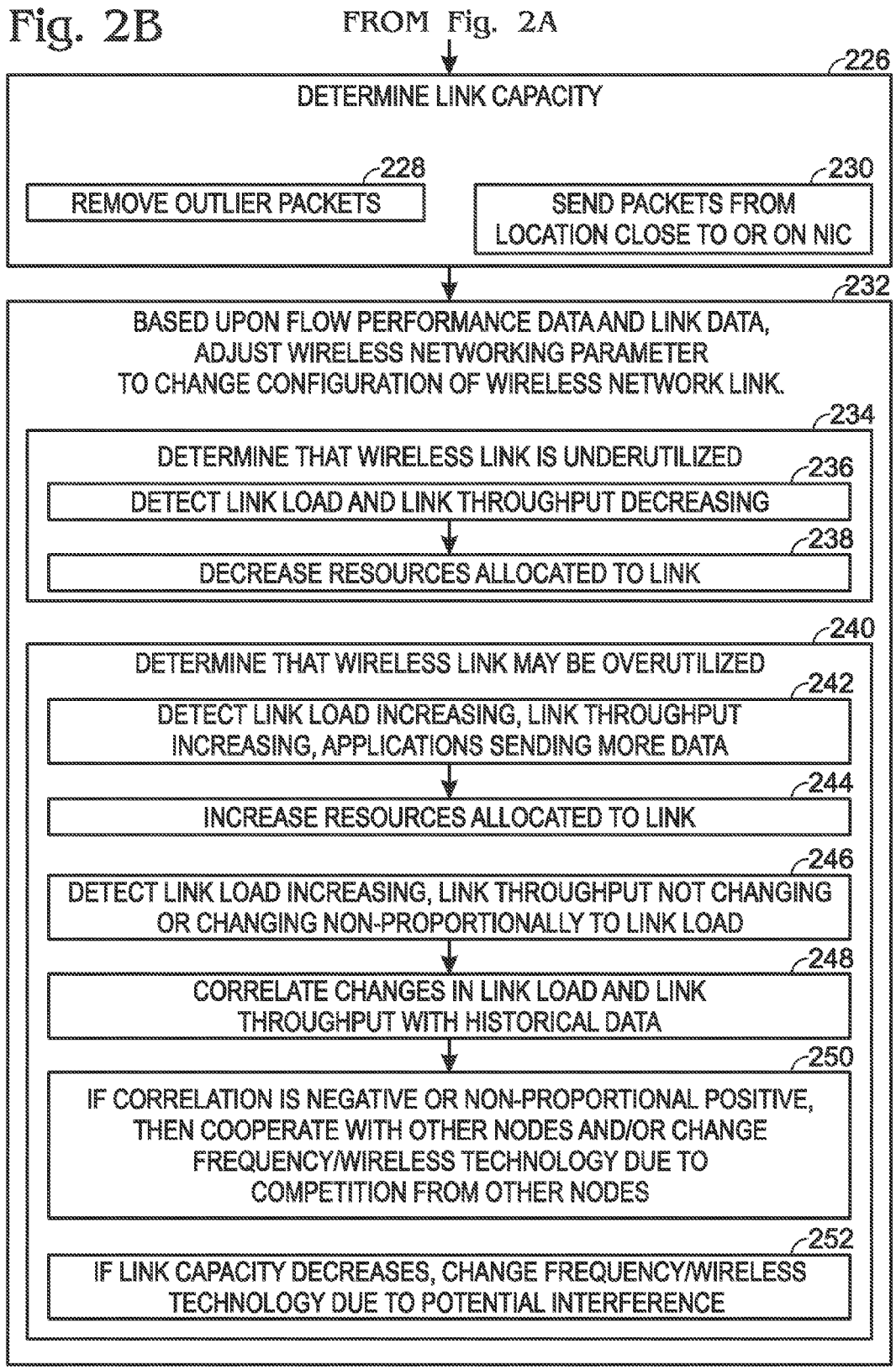

As mentioned above, device-to-device wireless connections may allow devices to share data without the use of a network access point. However, users may experience difficulties with such connections. For example, data transfer via a device-to-device wireless connection may be subject to competition from other devices (nodes) sharing the same wireless network link, and to electromagnetic interference that may decrease the capacity of a wireless network link. Such issues may cause noticeable degradation in wireless network link performance. Likewise, varying bandwidth usage of applications that exchange data between devices over a direct wireless network link also may cause noticeable network performance degradation.

However, when confronted with degradation in performance of a direct wireless connection, an ordinary user may not know how to diagnose and address the issues that are causing the degradation. For example, if a user is suffering glitches while playing back a video sent from the user's mobile phone to a television, the user may not be able to easily identify whether the glitches are due to overutilization of the wireless network link capabilities by the video streaming program, to competition from other nodes on the wireless network link, to electromagnetic interference, and/or to other problems. As such, the user may decide to switch to a wired connection.

Further, even to a trained user, diagnosing and correcting direct wireless network connection problems poses challenges. Considering that radio wave is invisible to human being without professional measurement equipment and radio conditions can change very quickly, the optimization of the network parameters may involve real-time understanding of complex processes happening at different levels of the wireless network communication stack, thus complicating the application of manual optimizations.

Current wireless networking technologies and standards that support direct wireless network communications, such as the IEEE 802.11 independent basic service set ("ad-hoc network"), WiFi-Direct, IEEE 802.11Z ("Extensions to Direct Link Setup"), and others, may provide insufficient mechanisms for automatic optimization, as such technologies may allow a few low level parameters, such as modulation schemes and/or transmission power, to be adjusted after connection establishment. Further, such adjustments may be based on local individual performance indicators.

Other parameters, such as channel frequency and channel bandwidth, may be defined by communication standards or configured during connection setup, and thus may not be changeable during transmission. Such kinds of static resource allocation or local optimization may lead to inefficient use of scarce radio spectrum and poor network performance in the crowded unlicensed 2.4 GHz or 5 GHz bands. For example, a fixed channel bandwidth of 20 MHz or 40 MHz is defined by standards for IEEE 802.11 network and thus used for any connection, regardless of the throughput of data to be transferred over the connection. Further, if the channel being used encounters severe interference, the system may lower the data rate by changing modulation scheme, which may further degrade the user experience. Further, changing the modulation scheme may not be as effective as another potential solution, such as using another free channel.

As mentioned above, direct wireless connection problems may arise from external sources (e.g. competition or interference), and/or from increased bandwidth usage by applications. However, inferring the bandwidth needs of applications may pose various challenges. As one potential solution, application developers may specify network requirements in applications, thereby allowing optimization to be performed based on specifications provided by such applications. However, the use of such methods with current applications may involve rewriting existing applications. Further, applications may have dynamic bandwidth demands depending user behavior and application logic. As such, application-specified network settings may not accurately reflect actual usage by such applications at any given time.

Accordingly, the disclosed embodiments relate to automatically adjusting wireless network settings by taking into account actual network utilization by applications. This may help to automatically optimize wireless settings based upon current network usage and performance. For example, in one embodiment, data flow between a network stack and a network interface controller is monitored to collect, for each of one or more applications running on the computing device and communicating over the wireless network link, flow performance data comprising information regarding an amount of data flow arising from network utilization by the application. Further, link data comprising information regarding data being sent and received over the wireless network link is also collected. As described in more detail below, the flow performance data may include flow throughput data regarding an amount of data flow arising from the application per a selected time interval. Further, the link data may comprise link performance data regarding an amount of data being sent over the wireless network link, link throughput data comprising an amount of data flow over the link per a selected time interval, and/or link load data comprising a representation of a utilization of the wireless network link compared to a capacity of the link. Based upon such information (and potentially other information, as described below), wireless network link issues may be automatically diagnosed, and one or more wireless networking parameters may be automatically adjusted to change a configuration of the network link to address the diagnosed issues.

Prior to discussing controlling wireless network settings based upon application data, an example use environment 100 is described with reference to FIG. 1. Use environment 100 comprises a plurality of computing devices with device-to-device wireless networking capabilities. In the depicted embodiment, non-limiting examples of such devices are illustrated as a smart phone 102, a television 104, a camera 106, and a printer 108. It will be understood that a computing device may include more than one of these technologies. For example, camera 106 may be incorporated into a smart phone or other device.

Smart phone 102 is illustrated as sending data directly to television 104 across a direct wireless network link 110. For example, smart phone 102 may be streaming a movie to television 104 for display. Likewise, camera 106 is illustrated as sending data (e.g. photographs) directly to printer 108 over wireless network link 110 for printing. As the two illustrated device-to-device wireless connections may share network link 110 (e.g. same frequency and channel), in some circumstances competition for bandwidth may result in glitches in video playback on television 104, and/or other user experience disruptions on any of the illustrated devices.

Use environment 100 also comprises an interference source 112. In some situations, electromagnetic radiation emitted by appliances, communications devices, wireless peripheral devices, and/or other common electronic devices, may interfere with wireless network link 110, and thereby degrade communications over wireless network link 110 and disrupt user experiences.

Diagnosing and correcting problems with communications over wireless network link 110 may pose challenges. For example, it may be difficult to determine whether such problems arise from overutilization of the link by an application (e.g. a video streaming application), from competition from other nodes on a wireless network link, and/or from interference. Current technologies may involve complex manual diagnostic processes that can pose difficulties to average users.

Thus, FIG. 2 shows a flow diagram illustrating an embodiment of a method 200 for automatically diagnosing device-to-device wireless network link problems, and for automatically taking actions to attempt to improve network performance and save power consumption, without user intervention and/or application changes. The term "wireless network link" as used herein refers to a direct wireless connection between two or more devices. It will be understood that method 200 may be performed on any suitable computing device.

Method 200 comprises, at 202, collecting flow performance data that comprises information regarding an amount of data flow arising from one or more applications on the computing device that are utilizing the wireless network link. The amount of data flow determined may include data sent from and/or received by the computing device. The flow performance data may comprise a measure of an amount data flow during a selected measurement period (which may be a configurable parameter), and/or a total amount of data flow to and/or from the application(s). Further, the flow performance data also may comprise flow throughput data 204 representing an average rate of delivered data for one or more time slot sizes (e.g. average throughput within a selected measurement period, average throughput since flow started, etc.). It will be noted that such flow performance data may reflect current and historic bandwidth usage of applications, and may be collected on an application-by-application basis.

Method 200 further comprises, at 206, collecting link data comprising information regarding data being sent and received over the wireless network link. As opposed to the flow performance data, which comprises application-specific information, the link data comprises link-specific data. Various types of link data may be collected. For example, the link data may comprise link performance data 208 regarding an amount of data flow being sent and received across the link, and/or link throughput data 210 representing an average rate of delivered data per selected time (e.g. per second) over the wireless network link.

Further, the link data also may comprise local link load data 212 that represents a utilization of a network interface controller that controls data flow between the computing device and the wireless network link compared to a full utilization. The local link load data 212 may represent a utilization of the local network interface controller (e.g. how busy the wireless network interface controller on the local computing device is sending packets over a period of time). As described below, the local link load data may be combined with non-local link load data from other nodes to determine a total link load. In some embodiments, the local link load data 212 may be expressed as a fractional quantity (e.g. as a percentage), such that the higher the local link load, the heavier the traffic burden on the wireless network interface controller.

The flow performance data, link performance data, and local link load may be determined in any suitable manner. First referring to the flow performance data and the link performance data, in some embodiments, information regarding an amount of data sent by applications across the wireless network link may be collected via a packet interception component located logically between a wireless network interface controller and a network communication stack. FIG. 3 shows an embodiment of an example architecture 300 for a system for controlling wireless networking settings, and illustrates an example packet interception component 302 located between one or more wireless network interface controllers 304 and a network communications stack 306, illustrated as a TCP/IP stack. One or more applications 308 are likewise in communication with the network communications stack 306.

Packet interception component 302 may be configured to collect data that is sent by applications 308 to wireless network interface controller(s) 304, and/or vice versa. Packet interception component 302 also may measure the performance of wireless network interface controller(s) 304. As non-limiting examples, in the context of a computing device running a WINDOWS operating system (available from Microsoft Corporation of Redmond, Wash.), packet interception component 302 may be implemented as a NDIS (Network Driver Interface Specification) intermediate driver or a NDIS filter driver. Packet interception component 302 may be bound to multiple wireless network interface controllers, and in such embodiments may be configured to forward data packets to the multiple underlying wireless network interface controllers.

As mentioned above, the data flows that are monitored by packet interception component 302 are established by applications 308. Each flow may comprise a TCP or UDP data connection between two wireless network nodes, and may be fully identified by the tuple (Protocol, Source IP, Source Port, Destination IP, Destination Port). It will be understood that each application 308 may create one or more flows.

Likewise, the local link load data may be determined in any suitable manner. In some cases, a wireless network interface control driver may be configured to provide such data. However, some current wireless network interface control drivers may not provide link load information. Thus, in some embodiments, packet interception component 302 may be configured to determine the local link load. As the local link load represents the link usage over a time period, the local link load may be determined by tracking an amount of time during a measurement period that the wireless network interface controller is in use, and then expressing the local link load as a percentage (or other suitable expression) of the fraction of time the wireless network interface controller was in use during the measurement period.

FIGS. 4A-4B illustrate an embodiment of a method 400 of determining a local link load of a wireless network interface controller that may be implemented on wireless adapters. Briefly, method 400 divides a measurement time period into multiple time slots, wherein the measurement time period and the duration of the time slots may be configurable, and tracks usage of the wireless network interface controller by comparing the number of time slots during which the wireless network interface controller was busy for sending packets compared to the total number of time slots in the measurement period.

The measurement period and duration of the time slots each may have any suitable values. In one non-limiting example, the measurement period is five hundred milliseconds divided into one thousand time slots of five hundred microseconds each.

Method 400 comprises two broader processes—the first is illustrated by steps 402-418 in FIGS. 4A-4B, and may run each time a packet is sent to the wireless network controller. The second broader process is illustrated by steps 420-430, is called when the local link load is being queried, and may be triggered, for example, by a timer, or in any other suitable manner.

Method 400 comprises, at 402, determining a value "starttime" that corresponds to a time that a packet is sent to the wireless network interface control driver, and at 404, determining a value "endtime" that corresponds to a time when the wireless network interface control driver completes sending the data packet. Next it is determined, at 406, whether the starttime or endtime is outside of a valid measurement time period window. If so, then the measurement is discarded as outdated, at 408, and method 400 ends.

On the other hand, if the startime and endtime are within the valid measurement time period window, then method 400 comprises, at 410, determining whether starttime is less than or equal to lastupdate time. If starttime is less than or equal to lastupdate time, then, at 412, all time slots between lastupdate time and endtime are marked as busy. Likewise, if starttime is not less than or equal to lastupdate time, then, at 414, all slots marked between lastupdatetime and starttime are marked as free (signifying that the wireless network interface controller was not busy during that time period), and, at 416, all time slots between starttime and endtime are marked as busy. After completing the appropriate marking of the time slots, method 400 comprises, at 418, updating lastupdatetime with endtime. As mentioned above, steps 402-420 may be performed for each packet processed by the wireless network interface controller.

Method 400 further comprises, at 420, detecting a trigger to evaluate the local link load. As mentioned above, in some embodiments, this trigger may be timer based. In other embodiments, any other suitable trigger may be used. Upon detecting the trigger, method 400 comprises, at 422, determining whether the lastupdatetime is too old compared to the currenttime (e.g. the trigger time), such that the wireless network interface controller may be determined not to have been busy for the measurement period. In this case, a value of zero is returned for the local link load, as indicated at 424.

If lastupdatetime is not too old compared to currenttime, then method 400 comprises, at 426, marking time slots between lastupdate time and currenttime as free if there are no outstanding packets (i.e. packets are being sent but sending has not yet been completed). On the other hand, if there are any outstanding packets, time slots between the lastupdate time and the earliest starttime of all outstanding packets are marked as free and time slots between the earliest starttime of all outstanding packets and the currenttime are marked as busy. Next, at 428, method 400 comprises counting the number of busy time slots. The current local link load ("currentlinkload") may then be determined as a ratio of the number of busy slots compared to the total number of slots. It will be understood that method 400 is presented for the purpose of example, and that a local link load may be determined in any other suitable manner.

Referring again to FIG. 2, the statistical data collected and produced by packet interception component 302 (which may include, but are not limited to, flow performance data, link performance data, and local link load data) may be evaluated and/or otherwise processed, as indicated at 216, to facilitate analysis of the data. Any suitable evaluation and/or other processing may be performed. For example, as indicated at 218, such processing may include, but is not limited to, smoothing of the flow performance data, the link performance data, and/or the local link load data. Data smoothing may help in the evaluation of performance data over a long time period by taking historical values into consideration.

The data may be smoothed in any suitable manner. For example, in some embodiments, the following expression may be used.

VALsmoothed=VALcurrent*WEIGHTcurrent+
 VALsmoothed*(1−WEIGHTcurrent);

where
 VALsmoothed=smoothed value of a performance data,
 VALcurrent=current value of a performance data, and
 WEIGHTcurrent: weight of current value; 0≤WEIGHTcurrent≤1.

Further, link load data may be obtained from other nodes to determine a total link load 220. The local link load provided by the packet interception component represents the link usage for sending packets on the local node. In order to have a full picture about how busy the link is, the determined local link load may be sent to nodes associated with the same link, and the local link loads of other nodes may be received from the other nodes, as indicated at 222. By summing up the local link load of all nodes, the system is able to determine the total link load, and thereby determine a link utilization status.

Additionally, as indicated at 224, a determination of bytes that were lost during transmission over the wireless link may be determined. This may be determined, for example, by exchanging the amount of data having been sent and received over a most recent measurement period between the sender and the receiver. Such information may provide an indication of the quality of the current wireless connection.

Method 200 may further comprise, at 226, determining a link capacity of the wireless network link. The link capacity may represent the maximal end-to-end throughput that may be achieved over the current connection. It may change over time, as both radio configuration and environmental conditions such as propagation characteristics and interference may affect the link capacity. However, the link capacity is not dependent on the traffic load of the link.

One potential way to determine a link capacity is to measure throughput by sending a large amount of data when the link is completely free. However, such an approach may not be feasible in practice, as it may create a large data overhead over the wireless link and thereby delay transmission of actual application data. It also may be difficult to ensure the link is completely free.

Thus, a potentially less disruptive and bandwidth-intensive method of determining link capacity may be to utilize a modified packet train method. Packet train methods may be used to estimate bandwidth by sending multiple back-to-back probe packets ("packet train") through the network, and measuring the time spacing from the end of last packet to the end of the current packet, also known as dispersion, at the receiver side. The link capacity may then be calculated by the following expression.

Link capacity=PacketSize/AverageTimeDispersion, where AverageTimeDispersion is the average value of the dispersion of N packets sent within a packet train.

Such a packet train method may be simple to implement, but may pose various implementation problems on a device-to-device wireless connection. For example, a wireless link may have some unstable characteristics, which may introduce random delay in packet delivery. Further, a device-to-device connection has a single hop, and therefore may have a relatively small time dispersion that makes the dispersion measurement sensitive to random noise. As a result, such a packet train technique may have widely varied measurement results and lead to erroneous capacity estimation.

Thus, to address these issues, such a packet train technique may be modified to remove packets that have an extra delay that may be due to noise, as indicated at 228. Further, to ensure that probe packets are sent back to back without cross traffic, the probe packets may be sent to a component that is physically and logically close to the wireless network interface controller, or even on the wireless network interface controller, as indicated at 230. As one non-limiting example, the packet train may be sent and received by a kernel-level timer that is part of a virtual network driver sitting directly on the physical wireless network interface controller.

One example of a suitable method of estimating a link capacity via a modified packet train technique is as follows, where $P_s$ is a packet size of each probe packet, n is a number of probe packets in the packet train, "Threshold" is a value of allowed variance of time dispersion, $N_v$ is a number of valid time intervals, and $t_i$ is the time dispersion of packet i. First, an average value (Ave) of the time dispersion of all packets is determined by Ave=$\Sigma t_i/n$.

Next, for all i=1 to n, the average value of the time dispersion and $N_v$ are updated as follows: Ave←(Ave*$N_v$−$t_i$)/($N_v$−1), and $N_v$←$N_v$−1 where $t_i$>(Ave+threshold). Then, the estimated link capability may be determined by Link Capacity=$P_s$/Ave.

The size of the probe packets and the number of probe packets in a packet train may have any suitable values. Further, these quantities may be configurable parameters in some embodiments. The amount of probe data used by the packet train may be selected to balance an accuracy of the capacity determination and the overhead caused by the transmission of the probe packets over the wireless link. In one non-limiting example, sixty probe packets each having a size of seven hundred bytes may be sent every ten seconds.

The above-described evaluation and/or other processing may be performed by any suitable component. For example, in the embodiment of FIG. 3, such processing may be performed by an evaluation component 310 configured to receive this statistical information from the packet interception component 302. The depicted evaluation component is implemented partly at the user level and partly at the kernel level, but may be implemented in any other suitable manner. The evaluation component may be responsible for determining the above-described performance indicators (e.g. smoothed data, lost bytes, total link load, link capacity) and/or other performance indicators, and for presenting the performance indicators to a decision component 312. Decision component 312 may be configured to decide whether and how to adjust wireless network parameters based upon the performance indicators, and to communication with a configuration component 314 that may implement changes to one or more wireless network parameters based upon communication with decision component 312. Evaluation component 310 and/or decision component 312 also may be in communication with a signaling component to exchange messages with other nodes on the wireless network link, for example, to share link load data, as described above.

It will be understood that the components illustrated in FIG. 3 may be implemented as kernel components or user-level components such as services, potentially depending upon the computing platform on which the components are implemented. For example, on the WINDOWS operating system, the packet interception component may be implemented as a virtual network driver or a network filter driver in the kernel, the evaluation component may run across the kernel and user level, and the decision component may run at the user-level. Further, depending on the implementation, the configuration component and the signaling component may be either at the kernel or the user level.

In addition to the performance indicators described above, evaluation component 310 also may retrieve any available quality information from the physical wireless network interface controllers. Examples of suitable quality information that may be available include, but are not limited to, a number of successfully transmitted packets, a number of successfully received packets, a number of transmission failures, a number of retransmissions, a number of times an expected ACK is missing, a number of times an expected clear-to-send (CTS) frame is missing, a number of packets having errors, etc.

Referring again to FIG. 2, method 200 comprises, at 232, adjusting one or more wireless networking parameters to change a configuration of the wireless network link based upon a determination that the current allocation of network resources is not appropriate for current application requirements. The determination of whether to adjust wireless network parameters may be performed by decision component 312, or by any other suitable component.

The adjustment of the one or more wireless networking parameters may be based upon a determination that the wireless network link is underutilized 234, or that the link may be overutilized 240. Where it is determined that the link may be overutilized, additional determinations may be made regarding whether the observed overutilized conditions may arise from increased utilization by applications, from competition from other nodes, or from external electromagnetic interference. Examples of such determinations are described in more detail below.

It is noted that applications may have very different patterns regarding network usage. For example, some applications, like video broadcasting, may send or receive data over network at a relatively stable data rate, while some other applications use network resources on a best-effort basis (i.e. as much bandwidth as possible), such as when downloading files or visiting web pages. Further, the duration of such best-effort transmission may not have any pre-defined pattern. Additionally, network usage by applications also may differ depending upon the protocol utilized for data transmission. For example, it may be easier to determine bandwidth requirements for applications using UDP than TCP, as UDP does not have any flow control mechanism. In contrast, difficulties may arise in determining bandwidth requirements for applications using TCP, as the built-in window-based flow control mechanism of TCP may adapt the transmission speed to available network bandwidth. For example, if a wireless network link becomes crowded, TCP automatically reduces the window size, which may lead to less network throughput. Thus, a decreased flow throughput may or may not be indicative alone that applications have less data to send or receive.

As such, other data may be used in combination with the flow throughput data to determine whether applications have more or less data to send across a wireless network link. For example, as shown in FIG. 2 at 236, a determination that a wireless link is underutilized based upon current application requirements may be made based upon a detected decrease in the link load (e.g. such that the link load meets or falls below a lower threshold level). This determination may further be supported where a decrease in the link throughput is observed along with a decrease in link load. Thus, where the link load falls below a threshold indicating link underutilization (and potentially in combination with decreasing link throughput), a link reconfiguration process may be triggered to decrease resources allocated to the wireless network link, as indicated at 238. Any suitable wireless networking parameter may be adjusted to decrease the network resources allocated to the link. As one non-limiting example, a spectrum bandwidth of the channel may be reduced. In this manner, spare spectrum may be freed for reallocation to other devices. Other non-limiting examples include, but are not limited to, changing a modulation scheme, communication frequency, and/or wireless technology used for the link.

As mentioned above, a determination also may be made as to whether the wireless link is overutilized, as indicated at 240. Such a determination may be made, for example, from an increasing link load (e.g. such that the link load meets or exceeds an upper threshold level). However, an increasing link load also may arise from other issues than increasing application demand that may call for different remedial measures. Thus, further analysis may be performed to determine what actions to take. For example, referring to FIG. 2 at 242, in addition to an increasing link load, link throughput and flow performance data also may be monitored. In the case where the link load, link throughput and flow performance data are all increasing, overutilization may be diagnosed. As another example, link throughput approaching the link capacity also may indicate overutilization. In this case, method 200 may comprise, at 244, increasing resources allocated to the wireless network link. Any suitable wireless network parameters may be adjusted to increase the allocated resources. Examples include, but are not limited to, increasing a channel bandwidth, using a higher modulation scheme, changing a communication frequency, and/or changing a wireless technology.

Another potential source for an increasing link load is where other devices may compete for the same radio resources, e.g. where another device is transmitting data using the same frequency as the link. In this case, link load may increase in a manner that is not accompanied by a proportional increase in link throughput (e.g. the link throughput stays the same, or rises non-proportionally due to changes in application usage combined with the effect from the competing device(s)). Thus, if an increase in the link load over the upper threshold level is not accompanied by a similar change in link throughput and the link capacity has no change or a minor change (e.g. less than a threshold amount), then historical data (e.g. saved by the decision component) may be analyzed to determine correlations between changes in link load and link throughput over time, as indicated at 248. If it is determined that these quantities have a negative or non-proportional positive correlation (e.g. the link load increases much faster than the link throughput, and/or exceeds a positive correlation threshold), then a competition situation may be determined. As the link capacity does not change much if a high link load is caused mainly by competition from other nodes, then a consistent link capacity may further indicate a competition situation.

Where competition from other nodes is determined, various remedial measures may be taken. For example, in a cooperative environment, competition may be resolved by coordinating between nodes (e.g. devices may coordinate to adjust network configurations appropriately). Further, other measures could alternatively or additionally be taken, such as changing to a different frequency, modulation scheme, and/or wireless technology used for the wireless network link.

Yet another potential cause of an increasing link load may be external electromagnetic interference. Such interference may affect transmission quality so that the link load increases, yet link throughput may remain consistent, decrease or increase depending upon application behavior. However, in contrast with competition from nodes, interference also may affect link capacity. Therefore, as indicated at 252, if a link capacity decrease is observed (e.g. to a capacity below a threshold value) along with an increase in link load, then it is possible that interference may be present. Other performance indicators, such as lost bytes, transmission failures and retransmission times, may provide further evidence of such interference. In this case, the communication frequency and/or wireless technology may be changed to attempt to avoid the interference. It will be understood that, in each of the above-described examples, to balance costs and benefits of reconfiguration, a stabilization time between two reconfiguration actions may be introduced.

In the manner described above, network resources may be allocated based upon inferred bandwidth requirements of applications without explicit input or feedback from the applications, in a manner independent of network hardware, and without changing the underlying device driver of the wireless adapters. Likewise, network performance may be diagnosed during transmission, which may allow corrective actions to be automatically undertaken.

The above described methods and processes may be tied to a computing system including one or more computers. In particular, the methods and processes described herein may be implemented as a computer application, computer service, computer API, computer library, and/or other computer program product.

Figure 5:
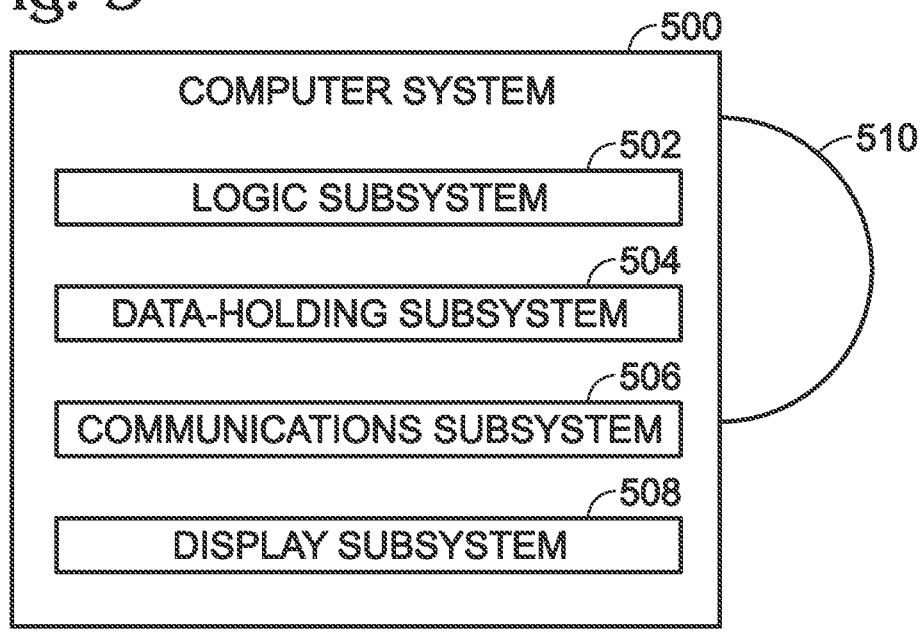
FIG. 5 shows an embodiment of a computing device.

FIG. 5 schematically shows a nonlimiting computing system 500 that may perform one or more of the above described methods and processes. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, television, video recorder, wearable computing device, and/or any other suitable device.

Computing system 500 includes a logic subsystem 502, a data-holding subsystem 504, and a communication subsystem 506 configured, for example, for device-to-device wireless communication, communication through wireless access points, via a cellular telephone network, and/or via any other suitable wireless technology. Computing system 500 may optionally include a display subsystem 508, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 504 may include one or more physical, non-transitory, devices configured to hold data and/or instructions executable by the logic subsystem to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that data-holding subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 500 that is implemented to perform one or more particular functions. In some cases, such a module, program, or engine may be instantiated via logic subsystem 502 executing instructions held by data-holding subsystem 504. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service," as used herein, may be an application program executable across multiple user sessions and available to one or more system components, programs, and/or other services. In some implementations, a service may run on a server responsive to a request from a client.

When included, display subsystem 508 may be used to present a visual representation of data held by data-holding subsystem 504. As the herein described methods and processes change the data held by the data-holding subsystem, and thus transform the state of the data-holding subsystem, the state of display subsystem 508 may likewise be transformed to visually represent changes in the underlying data. Display subsystem 508 may include one or more display devices utilizing virtually any type of technology. Such display devices may be combined with logic subsystem 502 and/or data-holding subsystem 504 in a shared enclosure, or such display devices may be peripheral display devices.

When included, communication subsystem 506 may be configured to communicatively couple computing system 500 with one or more other computing devices. Communication subsystem 506 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of adjusting a wireless networking parameter for a direct wireless network link, the method comprising:
monitoring data flow through a wireless network interface controller to collect, for each application of a plurality of applications running on the computing device and communicating over the direct wireless network link, flow performance data specific to each application, the flow performance data for each application comprising information regarding one or more data flows between the application and the direct wireless network link, the flow performance data also comprising information regarding an amount of data flow arising from each application;
monitoring link data comprising information regarding data being sent and received over the direct wireless network link, the link data comprising link performance data regarding an amount of data sent and/or received across the direct wireless network link, link throughput data regarding an average amount of data sent and/or received over the direct wireless network link over a selected time interval, and link load data regarding a utilization of the wireless network interface controller;
when the link load data meets or is below a lower threshold, then decreasing network resources allocated to the direct wireless network link; and
when the link load data meets a higher threshold, then determining whether the flow performance data, the link performance data, and the link throughput data are increasing, and when the flow performance data, the link performance data, and the link throughput data are increasing, then increasing network resources allocated to the direct wireless network link.

2. The method of claim 1, wherein the flow performance data for each application further comprises flow throughput data regarding an average amount of data sent and received arising from the application over a selected time interval.

3. The method of claim 1, wherein the link load data further comprises non-local link load data from other nodes on the wireless network link, and wherein the method further comprises receiving the non-local link load data from the other nodes on the direct wireless network link.

4. The method of claim 3, further comprising collecting the local link load data by tracking a fractional amount of time that the wireless network interface controller is being used to send packets during a measurement period time.

5. The method of claim 1, further comprising smoothing one or more of the flow performance data and the link data based upon historical data to form smoothed data, and adjusting the wireless networking parameter further based upon the smoothed data.

6. The method of claim 1, wherein monitoring data flow through the wireless network interface controller comprises monitoring data flow between the wireless network interface controller and a network stack.

7. The method of claim 1, wherein adjusting the wireless networking parameter comprises determining from the flow performance data and the link data that the direct wireless network link is underutilized based upon a decreasing amount of data flow to and from the one or more applications and a decreasing amount of data flow across the direct wireless network link, and adjusting the wireless networking parameter to decrease network resources allocated to the direct wireless network link.

8. The method of claim 1, wherein adjusting the wireless networking parameter comprises determining from the link data and flow performance data that the direct wireless network link is overutilized based upon an increasing amount of data flow to and from the one or more applications and an increasing amount of data flow across the direct wireless network link, and adjusting the wireless networking parameter to increase network resources allocated to the direct wireless network link.

9. The method of claim 1, wherein the link data comprises link load data and link performance data, and wherein adjusting the wireless networking parameter comprises:
determining a correlation between historical link load data and historical link performance data; and
when the correlation is a negative correlation or a positive correlation exceeding a threshold and the link capacity has no decrease or a decrease within a threshold amount, then performing one or more of,
coordinating with other nodes on the direct wireless network link, and
utilizing a different one or more of a different wireless technology and a different frequency.

10. The method of claim 1, wherein the link data comprises link capacity data, and wherein adjusting the wireless networking parameter comprises detecting a decrease in the link capacity data and an increase in the link load, and in response utilizing a different one or more of a different wireless technology and a different frequency.

11. The method of claim 10, further comprising determining the link capacity data by measuring a time dispersion of probe packets sent over the direct wireless link, wherein measuring the time dispersion comprises not considering with a delay that exceeds a threshold delay.

12. A computing device, comprising:
a logic subsystem; and
a data-holding subsystem comprising instructions stored thereon that are executable by the logic subsystem to
monitor data flow between a network stack and a wireless network interface controller to collect, for each of a plurality of applications running on the computing device and communicating over a direct wireless network link, flow performance data on an application-by-application basis, the flow performance data comprising information regarding an amount of data flow arising from each application that is sent over the direct wireless network link;
monitor link performance data comprising information regarding an amount of data being sent and received over the direct wireless network link;
determine link load data comprising information regarding a fractional utilization of a local network interface controller that controls an interface between the computing device and the direct wireless network link;
when the link load data meets or falls below a lower load threshold, then decrease network resources allocated to the direct wireless network link; and
when the link load data does not meet the lower threshold and meets or exceeds a higher threshold, then
determine a correlation of historical link load data and historical link performance data, and
when the correlation is a negative correlation or a positive correlation that meets or exceeds a threshold and the link capacity is constant or changes less than a threshold amount, then performing one or more of coordinating with other nodes on the direct wireless network link and utilizing one or more of a different wireless technology and a different frequency.

13. The computing device of claim 12, wherein the link load data comprises local link load data and non-local link load data, and wherein the instructions are executable to send the local link load data to other nodes on the direct wireless network link, to receive non-local link load data from the other nodes on the wireless network, and to sum the local link load data and the non-local link load data to determine the link load data.

14. The computing device of claim 12, wherein
when the correlation is not a negative correlation or a positive correlation that meets or exceeds the threshold, then the instructions are executable to increase network resources allocated to the direct wireless network link.

15. The computing device of claim 12, wherein the instructions are further executable to determine a link capacity of the direct wireless network link by measuring a time dispersion of probe packets sent over the wireless link, wherein measuring the time dispersion comprises not considering packets with a delay that exceeds a threshold delay in measuring the time dispersion, and
wherein the instructions are executable to adjust a wireless networking parameter by detecting an increase in the link load data and a decrease in the link capacity which exceeds a threshold decrease, and in response utilizing a different one or more of a different wireless technology and a different frequency.

16. On a computing device, a method of adjusting a wireless network setting for a direct wireless network link, the method comprising:
monitoring data flow between a network stack and a network interface controller to collect, for each application of a plurality of applications running on the computing device and communicating over the direct wireless network link, flow performance data on an application-by-application basis, the flow performance data comprising information regarding one or more data flows between an application and the direct wireless network link, the information regarding the one or more data flows comprising source application port information and destination application port information for each data flow, the flow performance data also comprising information regarding an amount of data flow arising from each application that is sent over the direct wireless network link and also comprising flow throughput data regarding an average amount of data flow to and from each application over a selected time interval;
monitoring link performance data comprising information regarding an amount of data being sent and received over the direct wireless network link and also comprising link throughput data regarding an average amount of data sent and received over the direct wireless network link over a selected time interval;
monitoring link load data comprising information regarding a utilization of a local network interface controller that controls an interface between the computing device and the direct wireless network link;
determining a link capacity of the direct wireless network link;
when the link load data meets or is below a lower threshold, then decreasing network resources allocated to the direct wireless network link;
when the link load data meets a higher threshold, then determining whether the flow performance data, the link performance data, and the link throughput data are increasing; and
when the flow performance data, the link performance data, and the link throughput data are increasing, then increasing network resources allocated to the direct wireless network link.

17. The method of claim 16, wherein, if the link load data meets the higher link load threshold and the link capacity is constant or changes less than a threshold amount, then determining a correlation between historical link load data and historical link performance data;
when the correlation is a negative correlation or a positive correlation meeting or exceeding a threshold, then performing one or more of coordinating with other nodes on the direct wireless network link and utilizing one or more of a different wireless technology and a different frequency; and
when the correlation is not a negative correlation or a positive correlation meeting or exceeding the threshold, then increasing the network resources allocated to the direct wireless network link.

18. The method of claim 16, further comprising detecting a decrease in the link capacity, and in response utilizing one or more of a different wireless technology and a different frequency.

* * * * *